United States Patent [19]

Coates

[11] Patent Number: 4,849,694
[45] Date of Patent: Jul. 18, 1989

[54] THICKNESS MEASUREMENTS OF THIN CONDUCTIVE FILMS

[75] Inventor: Vincent J. Coates, Palo Alto, Calif.

[73] Assignee: Nanometrics, Incorporated, Sunnyvale, Calif.

[21] Appl. No.: 923,491

[22] Filed: Oct. 27, 1986

[51] Int. Cl.$^4$ .................. G01B 7/10; G01R 33/12; G01N 27/72

[52] U.S. Cl. .................... 324/230; 324/226

[58] Field of Search ............. 324/229, 230, 231, 226, 324/158 R, 158 D; 356/3, 6, 9, 256; 350/110, 114, 115, 324

[56] References Cited

U.S. PATENT DOCUMENTS

| | | | |
|---|---|---|---|
| 2,629,004 | 2/1953 | Greenough | 324/230 |
| 3,876,691 | 2/1975 | Vanzetti | 324/158 D |
| 3,878,457 | 4/1975 | Rodgers | 324/229 |
| 4,005,359 | 1/1977 | Smoot | 324/230 |

Primary Examiner—Reinhard J. Eisenzopf
Assistant Examiner—Walter E. Snow
Attorney, Agent, or Firm—L. B. Castle

[57] ABSTRACT

Either resistivity or thickness of conductive thin films may be measured if the other one of the properties is known. The system employs eddy current apparatus including an alternating frequency driving coil, a detector coil mounted in a housing adjacent one surface of the thin film, and circuitry for measuring the signal across the detector coil which senses the field after it is subjected to the eddy currents generated within the conductive film. Precise adjustment of a fixed distance between coils and film surface is important and achievable by positioning the film surface at the focal point of a optical microscope objective lens to which the eddy current apparatus is coupled.

4 Claims, 1 Drawing Sheet

THICKNESS MEASUREMENTS OF THIN CONDUCTIVE FILMS

BRIEF SUMMARY OF THE INVENTION

This invention relates to an improved eddy current measuring system for accurately measuring the thickness of electrically conductive thin films.

Highly accurate and stable electro-optical measuring systems are presently available for measuring the thickness of certain very thin films. For example, The Model 200 NanoSpec/AFT manufactured by Nanometrics Incorporated of Sunnyvale, California can measure the thickness of transparent or semi-transparent films of materials such as the metal oxides, nitrides, etc. having thicknesses as low as 100 Angstroms to an accuracy of 5 Angstroms.

The thicknesses of very thin non-transparent films is not as easily determined as those of the transparent films, however. Non-transparent conductive films of metals, metal silicides or the like are more accurately measured by an AC generated eddy current provided, however, that certain parameters are known or readily determinable. For example, the detected strength of a field passing through a section of a conductive sample is dependent upon the thickness and resistivity (or conversely, the conductivity) of the sample, the distances between the excitation or driver coil to the thin film and from film to the detector coil, the excitation frequency, the field strength of the driver coil, and the number of turns in the detector coil.

The excitation frequency, the driver coil field strength, and the number of turns in the detection coil are known constants, and the resistivity of the conductive material is generally known or can be determined prior to or even after its deposition as a thin film on a substrate by known measurement methods. The distance between the driver coil and through the film sample to the detector coil can be measured with reasonable accuracy in the conventional prior art eddy current measurement systems in which conductive film samples are mounted in planes normal to the magnetic flux path between the driver coil and detector coil. With distance, detector coil windings, field strength, excitation frequency, and film resistivity known or readily determinable, the amplitude of the output signal across the detection coil is then proportional to the unknown film thickness. To determine a constant to apply to an output reading so that an output reading is a direct measurement of thin film thickness, it is only necessary to measure the detector coil output signal from a thin conductive film of known thickness.

The eddy current measurement system described and claimed herein employs fixed, coplanar excitation and sensor coils positioned adjacent each other on one side of a conductive thin film so that the generated alternating flux path passes from the excitation coil to the film, through the film, and then back an identical distance to the sensor coil without the need to pass through any substrate material that supports the film. In such a configuration, accurate determination of film thickness depends, not upon an actual measurement of distance between the coils and a specimen surface, but upon a highly accurate and constant distance for all films and irrespective of film repositioning problems, substrate curvatures or variations in thin film thicknesses.

There are several advantages of a system in which adjacent driver and detector coils are employed. For example, one important advantage is that the conductive film specimen is easily isolated from surrounding conductive structures that would contribute to errors. In those prior art systems wherein the conductive film is positioned in a normal plane between the coils, the film must be suspended in a holder that must not deflect the flux path through the film. In the improved system disclosed herein in which the flux does not pass through the film's substrate, it is only necessary to magnetically isolate the conductive film and its nonconductive substrate on a relatively thin nonconductive pad on a conventional metal X-Y stage.

As noted above, precise and consistent distance determining capabilities are necessary for accurate determinations of opaque conductive film thicknesses to assure that a constant distance between coils and film surface is always maintained irrespective of variations in film thickness or warping of the film's substrate. To assure such repeatable measurements, the coils are preferably mounted adjacent each other in a unit attachable to the objective lens housing of an optical microscope which can be accurately and consistently focused on a film surface to assure a constant distance value between excitation coil and film surface. Such a microscope may be a component of the aforementioned NanoSpec/AFT film thickness measurement instrument.

Such an optical microscope is focused by adjusting the distance between the objective lens and the film surface to optimize the sharpness of the image. The degree of precision in focusing is limited by the depth of focus of the microscope optics. The required distance can be set reproducibly within a band whose width is the depth of focus which depends upon the wavelength of the light illuminating the film surface and the numerical aperture of the microscope's objective lens. If the microscope is visually focused, as opposed to autofocusing, the accomodating power of the eye increases the depth of focus.

Depth of focus of an optical microscope may be calculated from the equation:

$$D \times \lambda (1 - NA^2)^{\frac{1}{2}} / NA^2 + 250/M^2$$

wherein D is the depth of focus in mm, $\lambda$ is the wavelength of the illumination in mm, NA is the numerical aperture of the objective lens which in air is equal to the sine of the half-angle of the cone of light that is accepted, and M is the overall magnification of the microscope. The second term of the equation is present only when visual observations are made. For example, a 1000 power microscope equipped with an objective of 0.95 numerical aperture and used visually with illumination at a wavelength of 550 nm has a depth of focus of 0.00044 millimeters. Thus, the distance from the objective lens to the surface of a film can be set with a precision of 0.00044 millimeters. For non-visual focusing the depth of focus is reduced to 0.00019 millimeters.

BRIEF DESCRIPTION OF THE DRAWINGS

In the drawings which illustrate the preferred embodiment of the invention.

DETAILED DESCRIPTION OF THE PREFERRED EMBODIMENT

In a non-transparent, conductive film measuring system employing eddy currents generated by an alternating field, the measured output signal across a detector coil located adjacent the film is dependent upon the strength of the generated alternating magnetic field, frequency of the field, the turns on the detector coil, the resistivity of the conductive film, the film thickness, and the distances between the film and the driver coil and the detector coil. As will be described, the field strength, frequency, and detector coil data are known, and the distance between coils and film becomes a constant value in the measurement of all films by the accurate focusing of an optical microscope with fixed optical characteristics on the film surface. Thus, either film thickness or its resistivity may be measured if the other value is known or determined. Normally, the composition of a conductive film is known so that its resistivity can be computed by well known means. With this data available, the unknown film thickness may be measured.

Figure 1:
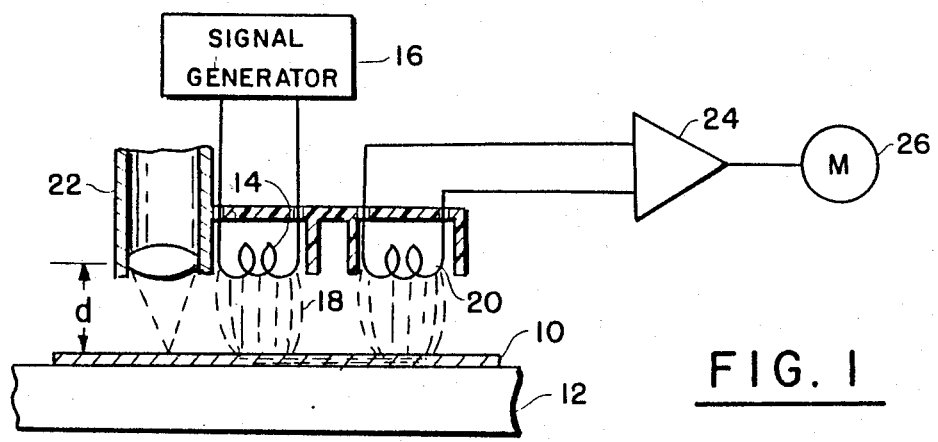
FIG. 1 is a schematic diagram illustrating the principles involved in the invention.

FIG. 1 is an elevational schematic view illustrating a conductive non-transparent thin film 10 on the surface of a nonconductive substrate 12. The film may, for example, be a thin electrical conductor or element adhering to the surface of a silicon wafer.

Positioned a short distance "d" above the surface of the film 10 is a driver coil 14 which is excited by a high frequency alternating signal source 16 to produce a magnetic field 18 having an intensity determined by the signal current times the number of turns on the driver coil. The excitation frequency from the signal source should be fixed at approximately 30 KHz or higher.

The alternating field generated by the driver coil 14 passes through the short fixed distance "d" to the conductive film having a known resistivity but unknown thickness and therefore unknown cross-sectional area. The predetermined resistivity of the film material is proportional to the resistance offered by the material to eddy current, times the cross sectional area of eddy current flow, and eddy current is that current induced within the thin conductive film by the alternating field changes. Thus, the field 18 generated by the driver coil 14 induces within the thin conductive film Foucault or eddy currents which, in producing $I^2R$ heat losses in the film, draw energy from the magnetic field 18 and operate to weaken the output magnetic field which is finally sensed by a detector coil 20 located adjacent the driver coil 14 and spaced a fixed distance therefrom.

In eddy current measurements in which both driver and detector coils are located adjacent one surface of the specimen, the precise and repeatable value of the distance "d" between coils and conductive film surface is critical and must remain constant. Any inconsistency resulting in an error in the accurate focusing adjustment will double the error in the value "d" since the flux path length is similarly doubled in its return from film to detector coil. In the preferred embodiment, a constant and repeatable distance value of "d" is made by accurately focusing on the film surface a precision optical microscope which may be a component of the previously mentioned NanoSpec/AFT film thickness measurement system for measuring transparent and semitransparent thin films.

The detector coil 20, which may be in parallel with a capacitance to form a tank circuit tuned to the frequency of the signal generator 16, is coupled to an amplifier 24 the output from which is connected to a suitable meter 26 which, as previously mentioned, may be calibrated to directly indicate thin film thickness. It is to be noted that the system described may be calibrated to measure resistivity of a thin film provided its thickness is accurately known since all parameters except thickness and resistivity are constants in one system.

Figure 2:
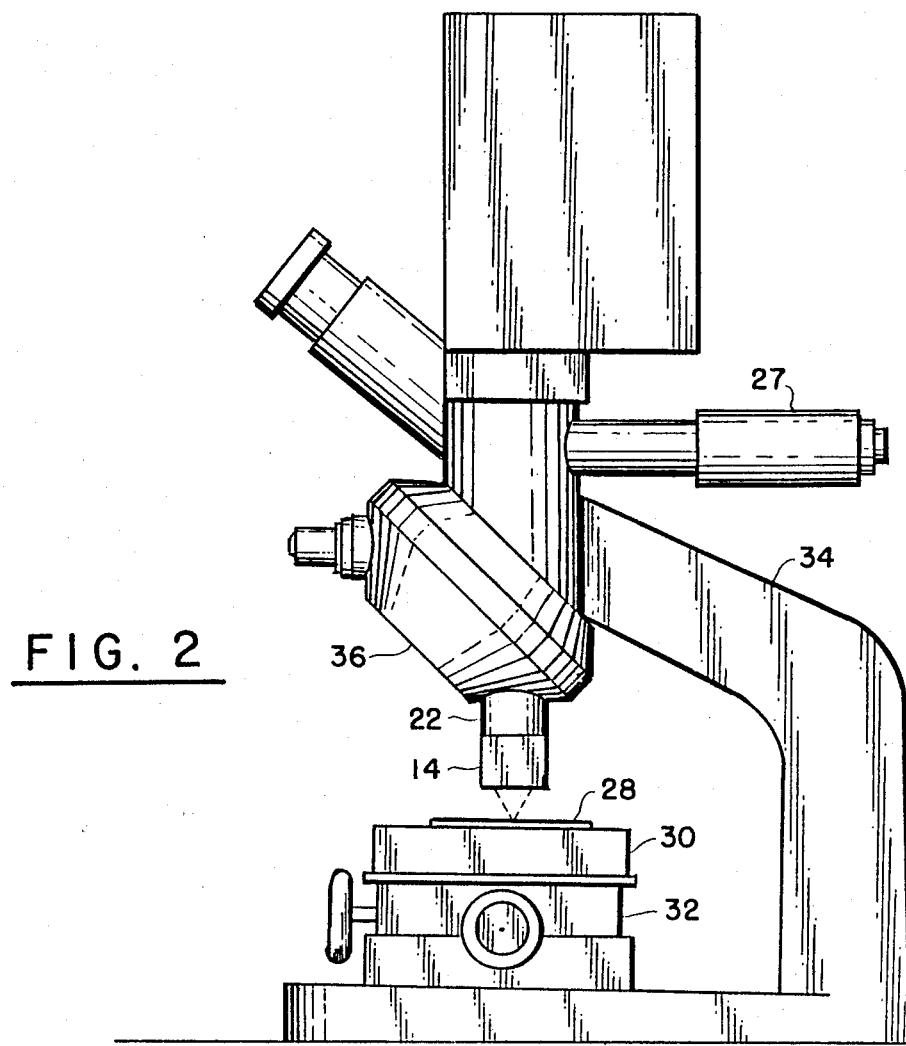
FIG. 2 is an elevational view illustrating the eddy current measurement system mounted to a microscope capable of maintaining an accurate reproducible distance between coils and conductive film surface.

FIG. 2 illustrates the components of FIG. 1 in conjunction with the optical head of the NanoSpec/AFT film thickness measuring system and an illuminating source 27 having a predetermined or fixed wavelength. In FIG. 2, it is assumed that a non-conductive silicon wafer 28 is partially coated with a conductive film on the top surface thereof. The film coated wafer 28 is preferably supported upon a relatively thick plastic block 30 which minimizes possible errors that normally would be caused by interaction of the generated magnetic field with the conductive microscope stage 32 and microscope housing 34 upon which it stands.

For mechanical stability, the single package containing the driver coil 14 and detector coil 20 of FIG. 1 is attached to the microscope objective lens housing to form a composite unit which may be mounted in one position in the microscope lens turret 36 as illustrated in FIG. 2. The associated amplifier and meter of the system may be placed apart but near the measurement equipment for convenience.

I claim:

1. In combination with microscope means for focusing upon a first surface of a conductive film having a known resistivity and for maintaining a fixed distance between a point in said microscope means and said first surface, eddy current apparatus for the determination of thickness of said film, said apparatus comprising:

magnetic field producing means located adjacent the first surface of the conductive film for producing an alternating frequency, eddy current inducing magnetic field in said film, said field producing means including a driving coil spaced from said first film surface by a distance corresponding to the distance between said first surface and the fixed point in the microscope means; and sensing means including a detector coil located adjacent the first surface of said conductive film at a predetermined distance from said driving coil and spaced from said first surface by a distance equal to that of said driving coil, said sensing means including an amplifier and measuring means for sensing the amplitude of the alternating magnetic field passing through said film and retarded by eddy currents induced within said film, said driving coil and said detector coil being magnetically unlinked by ferromagnetic means except through said conductive film.

2. The apparatus claimed in claim 1 wherein said driving coil and said sensing coil are mounted within a coil housing coupled to the microscope means.

3. The apparatus claimed in claim 2 wherein the microscope means includes an optical microscope having an objective lens in a lens housing, and said coil housing is attached to said objective lens housing.

4. A method for determining the thickness by eddy current techniques of a conductive film having an exposed first surface and a second surface adhering to a substrate, said film having a known resistivity, said method comprising the steps of;

positioning the film so that the exposed first surface thereof is at the fixed focal point of an optical microscope;

producing an alternating magnetic field with predetermined characteristics from a driving coil adjacent said first surface and spaced therefrom by a distance corresponding to the focal distance of said microscope; and sensing the amplitude of the alternating magnetic field emanating from said film with a sensing coil coupled to amplifying and measuring means, said sensing coil being spaced a predetermined distance along said first surface from said driving coil and magnetically isolated therefrom by ferromagnetic means other than said film, said sensing coil having a predetermined number of windings, said sensing coil being positioned adjacent said first surface and spaced from said first surface by a distance corresponding to the focal distance of said microscope.

* * * * *